(12) United States Patent
Rhodes

(10) Patent No.: US 7,717,636 B2
(45) Date of Patent: May 18, 2010

(54) HAND-HELD DRY-ERASE BOARD SYSTEM

(76) Inventor: Julia M. Rhodes, P.O. Box 4796, Sonora, CA (US) 95370

( * ) Notice: Subject to any disclaimer, the term of this patent is extended or adjusted under 35 U.S.C. 154(b) by 616 days.

(21) Appl. No.: 11/535,114

(22) Filed: Sep. 26, 2006

(65) Prior Publication Data
US 2007/0071536 A1   Mar. 29, 2007

Related U.S. Application Data

(63) Continuation of application No. 11/534,701, filed on Sep. 25, 2006, now abandoned.

(60) Provisional application No. 60/720,634, filed on Sep. 26, 2005.

(51) Int. Cl.
B43K 29/00 (2006.01)

(52) U.S. Cl. .................. 401/195; 401/52; 401/131; 434/408

(58) Field of Classification Search .................. 401/195, 401/52, 131; 434/408; 211/69.1
See application file for complete search history.

(56) References Cited

U.S. PATENT DOCUMENTS

| | | | |
|---|---|---|---|
| 4,875,591 A * | 10/1989 | Mikesell | 211/69.1 |
| 5,072,483 A * | 12/1991 | Durand | 15/210.1 |
| 5,263,366 A | 11/1993 | Campbell | |
| 5,294,114 A | 3/1994 | Stillinger | |
| 5,599,189 A | 2/1997 | Kees et al. | |
| 5,626,478 A | 5/1997 | Gatlin | |
| 5,743,414 A | 4/1998 | Baudino | |
| 5,957,603 A * | 9/1999 | Bell | 401/52 |
| 5,987,794 A * | 11/1999 | Lavi et al. | 40/611.04 |
| 5,997,309 A | 12/1999 | Metheny et al. | |
| 6,265,074 B1 | 7/2001 | Shah et al. | |
| 6,347,898 B1 * | 2/2002 | Rhodes et al. | 401/52 |
| 6,595,143 B2 | 7/2003 | London | |
| 6,626,675 B1 | 9/2003 | Webber et al. | |
| 6,666,424 B2 | 12/2003 | Richardson | |
| D496,068 S * | 9/2004 | Mandel | D19/36 |
| 6,837,715 B2 | 1/2005 | Beno | |
| 6,866,516 B2 | 3/2005 | Smith et al. | |
| 6,893,266 B2 | 5/2005 | Donelan | |
| 6,932,531 B2 | 8/2005 | Marschand et al. | |

FOREIGN PATENT DOCUMENTS

GB    2 296 898    7/1996

OTHER PUBLICATIONS

European Search Report dated Dec. 15, 2009 issued on counterpart EP Appln. No. 06815475.6.

* cited by examiner

Primary Examiner—David J Walczak
(74) Attorney, Agent, or Firm—Williams Mullen; M. Bruce Harper

(57) ABSTRACT

A hand-held dry-erase board system for efficiently storing a writing instrument in the handle of a portable dry-erase board. The hand-held dry-erase board system includes a frame including a writable surface, a handle, wherein the handle includes an upper end and a lower end and wherein the upper end of the handle is attached to the frame and a clip, wherein the clip is attached to the handle and wherein the clip secures a marker.

6 Claims, 5 Drawing Sheets

HAND-HELD DRY-ERASE BOARD SYSTEM

CROSS REFERENCE TO RELATED APPLICATIONS

I hereby claim benefit under Title 35, United States Code, Section 119(e) of U.S. provisional patent application Ser. No. 60/720,634 filed Sep. 26, 2005 and under Title 35, United States Code, Section 120 of U.S. patent application Ser. No. 11/534,701 filed Sep. 25, 2006. The Ser. No. 60/720,634 application and the Ser. No. 11/534,701 are now abandoned. This application is a continuation of the Ser. No. 11/534,701 application. The 60/720,634 and the Ser. No. 11/534,701 application are hereby incorporated by reference into this application.

STATEMENT REGARDING FEDERALLY SPONSERED RESEARCH OR DEVELOPMENT

Not applicable to this application.

BACKGROUND OF THE INVENTION

1. Field of the Invention

The present invention relates generally to learning aids and more specifically it relates to a hand-held dry-erase board system for efficiently combining a dry-erase board, a marker and an eraser into one package.

2. Description of the Related Art

Any discussion of the prior art throughout the specification should in no way be considered as an admission that such prior art is widely known or forms part of common general knowledge in the field.

Learning aids have been in use for years. Typically, learning aids have included items such as flashcards, small chalk boards and small dry-erase boards. When using flashcards, a student or teacher will read the question on one side of the flashcard and, when ready, flip it over to read the answer. Portable chalk boards and dry-erase boards usually include a board along with a piece of chalk or dry-erase marker and then a separate eraser. The student or teacher may write a question on one side of the board and then either erase it, or if the board has two sides, flip it over to reveal the answer (providing the answer was previously written on the back).

A disadvantage with flashcards is that they are not usually able to be modified and are generally not written on. This can hinder the student's learning ability as the flash card may not adequately describe the solution to the given problem. Portable chalk boards pose the problem of leaving messy chalk dust and small pieces of chalk everywhere. Chalk boards can also be difficult to read from a distance (i.e. the back of a classroom). A problem with past portable dry-erase boards is that it can be cumbersome to carry around a separate board, marker and eraser simultaneously.

While these devices may be suitable for the particular purpose to which they address, they are not as suitable for efficiently combining a dry-erase board, a marker and an eraser into one package. Past chalk boards and dry-erase boards have posed a significant problem in that it can be very cumbersome to carry around a board, a marker or chalk and an eraser at one time.

In these respects, the hand-held dry-erase board system according to the present invention substantially departs from the conventional concepts and designs of the prior art, and in so doing provides an apparatus primarily developed for the purpose of efficiently combining a dry-erase board, a marker and an eraser into one convenient package.

BRIEF SUMMARY OF THE INVENTION

The invention relates to a hand-held writing system which includes a frame, a handle, and a clip. At least one writing surface, and optionally a second writing surface on the opposing surface to the first writing surface, may also be located within the frame. The system includes a handle which is attached to the frame at one end. A clip is attached to the handle to permit a writing instrument to be removably retained to the handle.

In one embodiment, the writing surface of the system includes a smooth laminate finish which is suitable for writing with a dry-erase marker. The surface would thus be a write on-wipe off surface. Such a marker would include a marker handle and a writing tip, and preferably includes a cap which is removably attached to the marker and covers the writing tip when not in use. The dry-erase marker may further include an eraser suitable for erasing markings from the writing surface of the system. The eraser may be attached to the cap or to the end of the marker distal to the writing tip.

The handle of the system of the present invention may be designed of a specific size and shape to be held comfortably by a user and may have an ergonomic gripping structure and configuration. In a particular embodiment, the handle may include a second clip on the side of the handle opposing the side containing the first clip. In this way, the handle may be capable of supporting a second writing instrument simultaneously with the first. The clips are comprised of first and second ribs within which the writing instruments may be stored when not in use. The ribs may be positioned below the surface of the handle to prevent the clip from interfering with a user gripping the handle. Each rib may include first and second locking members at a distance slightly smaller than the diameter of the writing instruments. The locking members permit the writing instrument may be removably fastened between the ribs to keep the instruments affixed to the handle when not in use.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
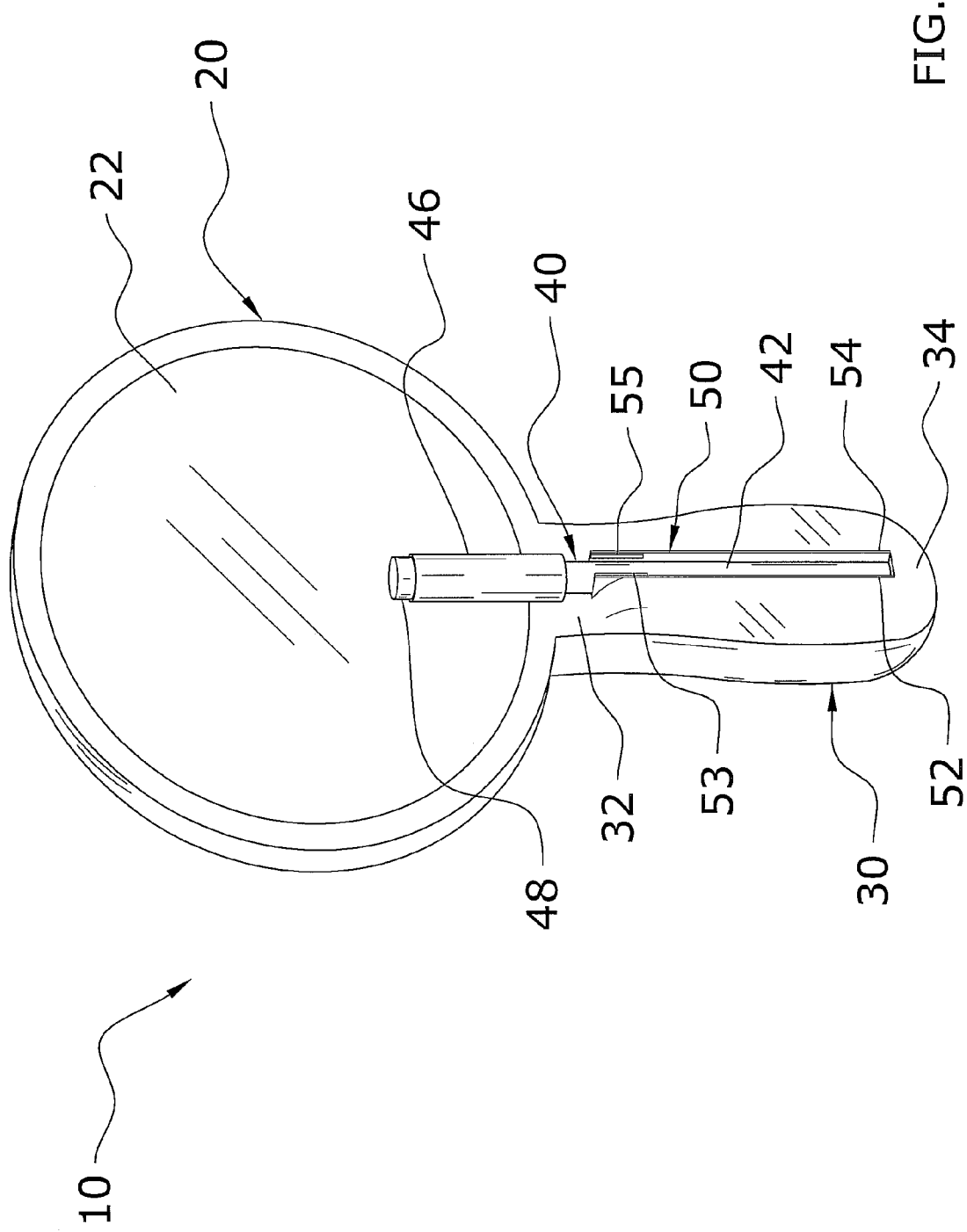
FIG. 1 is an upper perspective view of the present invention.

Turning now descriptively to the drawings, in which similar reference characters denote similar elements throughout the several views, FIGS. 1 through 5 illustrate a hand-held dry-erase board system 10, which comprises a frame 20 including a writable surface, a handle 30, wherein the handle 30 includes an upper end 32 and a lower end 34 and wherein the upper end 32 of the handle 30 is attached to the frame 20 and a clip 50, wherein the clip 50 is attached to the handle 30 and wherein the clip 50 secures a marker unit 40.

B. Frame

The frame 20 is preferably comprised of a circular structure and configuration as shown in FIGS. 1 through 4; however it is appreciated that the frame 20 may be comprised of various shapes rather than the preferred embodiment, such as but not limited to square, rectangular and triangular. The frame 20 is preferably comprised of a stiff material (i.e. wood, masonite, plastic, etc.) and is suitable for holding a writable surface.

Figure 3:
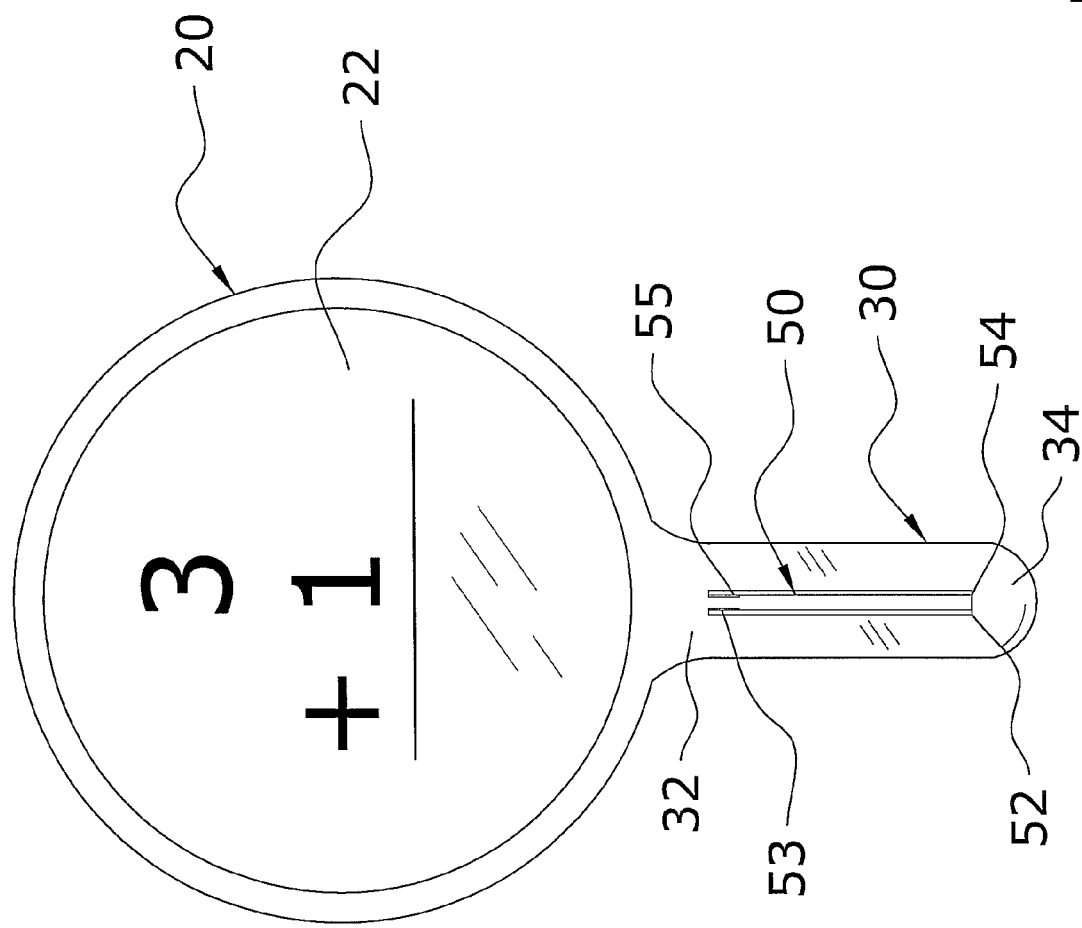
FIG. 3 is a front view of the present invention with a question written on the first surface.
Figure 4:
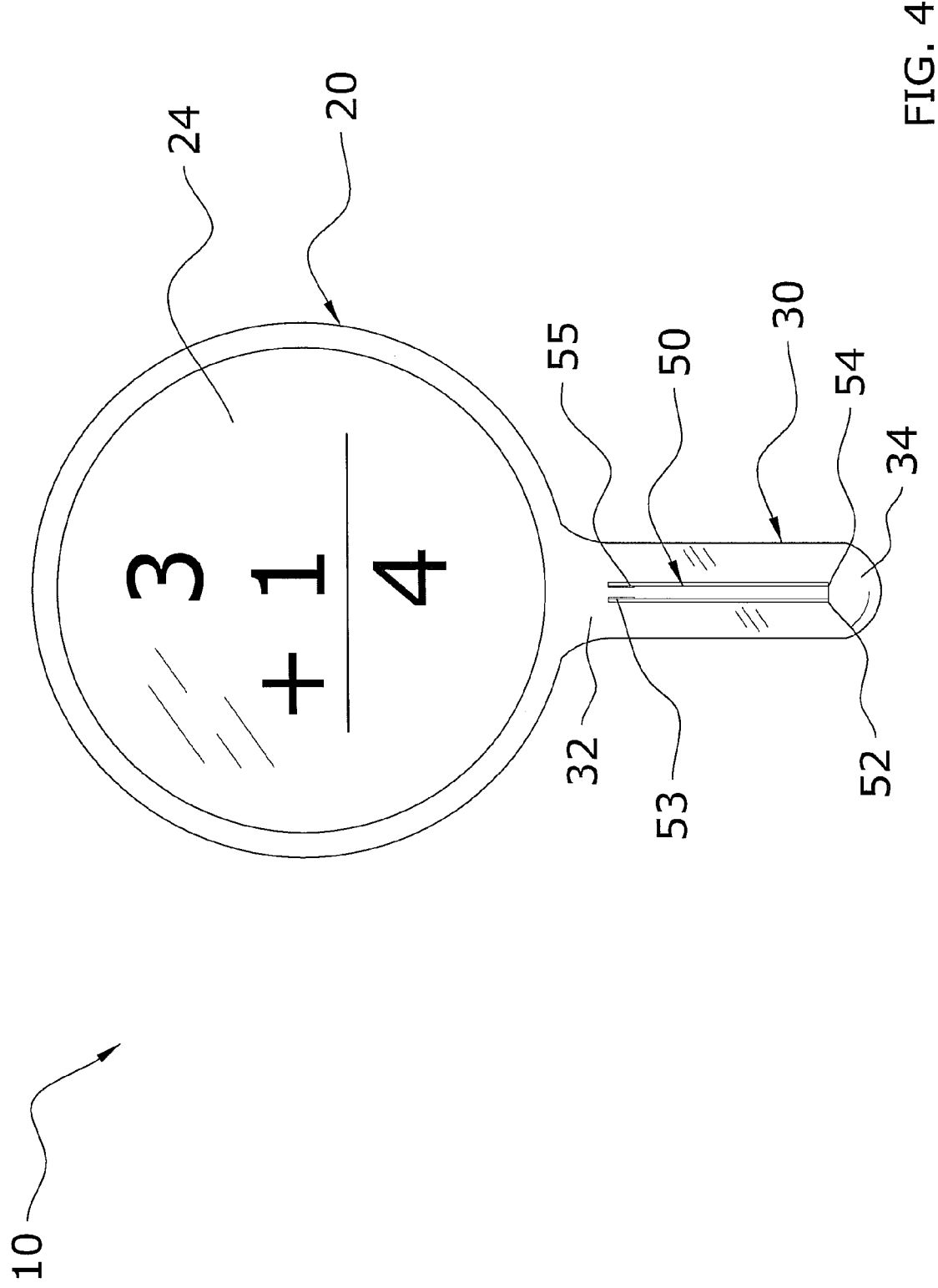
FIG. 4 is a rear view of the present invention with a solution written on the second surface.

The writable surface is preferably comprised of a first surface 22 and a second surface 24, where the first surface 22 and the second surface 24 are preferably on opposite sides of the frame 20, as shown in FIGS. 3 and 4. The first surface 22 and the second surface 24 are preferably of a substantially similar configuration. The first surface 22 and the second surface 24 are also preferably of a circular structure and configuration. The size and shape of the first surface 22 and the second surface 24 are preferably similar, but slightly smaller in diameter, to the circular configuration of the frame 20.

The first surface 22 and the second surface 24 are preferably comprised of a smooth laminate coating (i.e. porcelain, epoxy-coated film, ultraviolet cured liquid, varnish, etc.) or any coating that can be written on and erased with dry-erase markers and erasers, as shown in FIGS. 3 and 4. The coating used for the first surface 22 and the second surface 24 is preferably substantially similar. The first surface 22 and the second surface 24 may also have a pre-printed outline of any form of indicia (i.e. basketball court, line up of football players, etc.).

C. Handle

The handle 30 is preferably comprised of a material as to be easily gripped by a user (i.e. dense foam, plastic, rubber, etc.), as shown in FIGS. 1 through 5. The handle 30 is preferably an integrally formed structure with the frame 20; however the handle 30 may be comprised of a separate structure from the frame 20. The handle 30 is also preferably comprised of an ergonomic gripping design structure and configuration.

Figure 2:
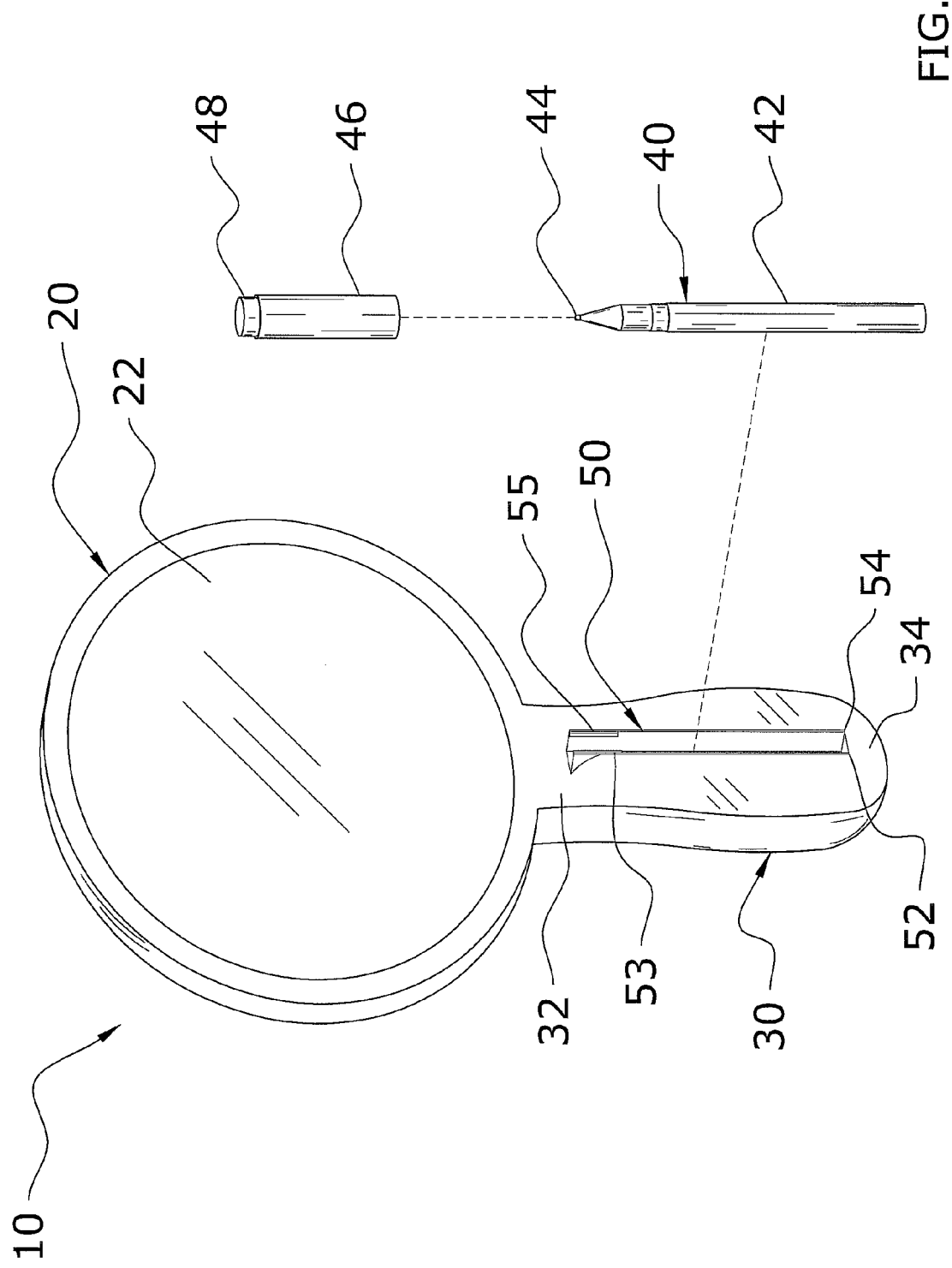
FIG. 2 is an upper exploded perspective view of the present invention.
Figure 5:
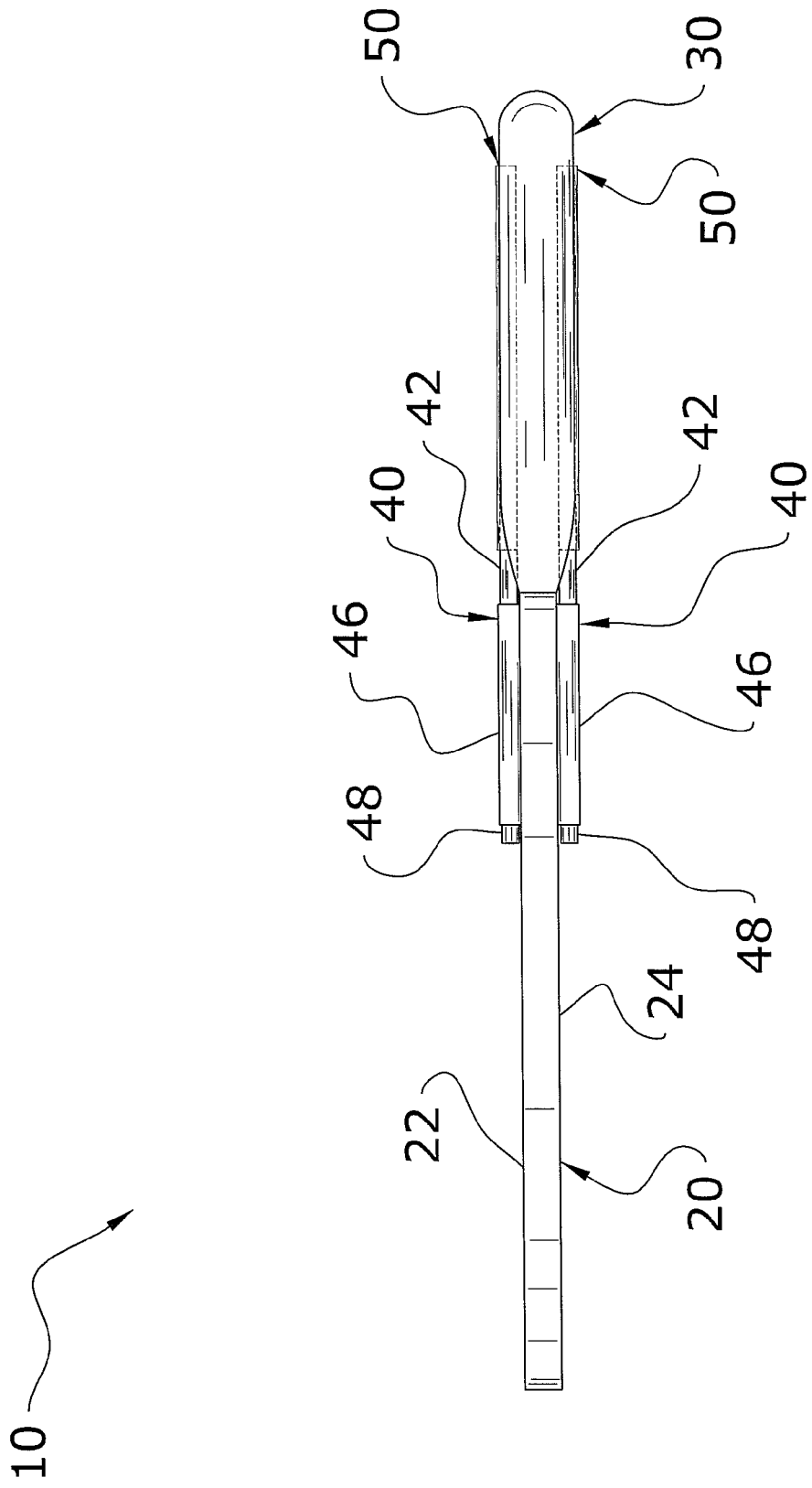
FIG. 5 is a side view of the present invention with the marker attached to the handle.

The handle 30 preferably includes a clip 50 on the same side of the hand-held dry-erase board system 10 as the first surface 22, where the clip 50 securely holds the marker unit 40, as shown in FIGS. 1 through 3. The handle 30 preferably is formed to include a clip 50 on both sides of the handle 30 to allow the user to secure two markers 40 to the hand-held dry-erase board system 10 as illustrated in FIGS. 3 through 5.

The clip 50 preferably includes a first rib 52 and a second rib 54. The first rib 52 and the second rib 54 are preferably of a substantially similar structure and configuration. The first rib 52 and the second rib 54 are preferably comprised of channel structures that extend into the handle 30, as not to be in the way from gripping the handle 30, as shown in FIGS. 1 through 5. The portion of the clip 50 furthest below the outer surface of the handle 30 is preferably coplanar with the edge of the first surface 22 as shown in FIG. 5. In this way, the marker unit 40 rests in a horizontal position within the clip 50 when the hand-held dry-erase board system 10 is laid on a horizontal surface, such as a table or a desk.

The first rib 52 preferably includes a first locking member 53 and the second rib 54 preferably includes a second locking member 55. The first locking member 53 and the second locking member 55 are preferably positioned towards the upper end 32 of the handle 30 on the clip 50. The first locking member 53 and the second locking member 55 extend towards one another to create a slightly smaller width between the first locking member 53 and the second locking member 55 than the width between the first rib 52 and the second rib 54 near the lower end 34 of the handle 30. This to provide a secure holding place for the marker unit 40, when the marker handle 42 is in the clip 50, as shown in FIG. 1.

D. Marker Unit

The marker unit 40 is preferably of a structure and configuration of a dry-erase marker. The marker unit 40 includes a writing tip 44 and the marker handle 42, as shown in FIG. 2. The writing tip 44 is used to write on the first surface 22 and the second surface 24. The marker unit 40 also preferably includes a cap 46, where the cap 46 connects to the marker handle 42 and covers the writing tip 44 from outside elements. It is also appreciated that the marker unit 40 may be comprised of a configuration rather than a dry erase marker, such as but not limited to a chalk configuration or pencil configuration.

The cap 46 also preferably includes an eraser 48, as shown in FIGS. 1, 2 and 5. The eraser 48 is preferably positioned at the top of the cap 46 at the furthest point from the marker handle 42. The eraser 48 is preferably of a structure and configuration to erase writing on the first surface 22 and the second surface 24 from the writing tip 44. The eraser 48 is preferably comprised of a configuration of a standard dry erase board eraser; however it is appreciated that the eraser 48 may be comprised of various configurations rather than the preferred embodiment, such as but not limited to a chalk board eraser configuration or pencil eraser configuration.

E. Operation of Invention

The teacher or student first grasps the handle 30 in a way to not cover the marker unit 40. The marker unit 40 is then removed from the first locking member 53 and the second locking member 55 of the clip 50. The cap 46 from the marker unit 40 is then removed from the marker handle 42. The teacher may then firmly grasp the marker handle 42 and write a question (i.e. 3+1), using the writing tip 44, on the first surface 22, as shown in FIG. 3. The teacher may also write the appropriate answer to the given question, at this time, on the second surface 24 (i.e. 3+1=4), as shown in FIG. 4.

The teacher then replaces the cap 46 back on the marker handle 42 and then places the marker handle 42 back into the first locking member 53 and the second locking member 55 of the clip 50. The teacher now holds up the hand-held dry-erase board system 10 for his/her class to view. This is done in a manner so that the class may only see the first surface 22 of the hand-held dry-erase board system 10.

Once an individual in the class, or the entire class, guesses the answer to the question the teacher turns around the hand-held dry-erase board system 10 to reveal the second surface 24 and the answer to the question. The teacher may now remove the marker unit 40 from the first locking member 53 and the second locking member 55 of the clip 50, and rub the eraser 48 over the writing on the first surface 22 and the second surface 24. The eraser 48 erases the writing on the first surface 22 and the second surface 24 so that the teacher may now write a new question for his/her class. Every student in the class may also utilize the hand-held dry-erase board system 10 to respond to the teachers question with their individual response. To write a new question, the above process is simply repeated.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A hand-held writing system comprising:
   a frame including at least one writable surface;
   a handle including an upper end and a lower end, wherein said upper end of said handle is attached to said frame with the lower end unattached to said frame, forming an ergonomic gripping structure and configuration;
   at least one clip attached to said handle, wherein said clip removably retains a writing instrument; and
   wherein the handle has an outer surface, said at least one clip of said handle extends into said handle to define a channel, a portion of the channel being below the outer surface and coplanar with the writable surface.

2. A hand-held writing system comprising:
   a frame including at least one writable surface;
   a handle including an upper end and a lower end, wherein said upper end of said handle is attached to said frame with the lower end unattached to said frame, forming an ergonomic gripping structure and configuration;
   at least one clip attached to said handle, wherein said clip removably retains a writing instrument; and
   wherein said at least one clip includes a first clip and a second clip, wherein said first clip is attached to a first side of said handle and wherein said second clip is attached to an opposite side of said handle as said first clip.

3. A hand-held writing system, comprising:
   a frame including a writable surface, wherein said writable surface includes a first writable surface and a second writable surface, wherein said first writable surface and said second writable surface are on opposite sides of said frame and wherein said first writable surface and said second writable surface are comprised of a substantially similar structure and configuration;
   a handle, wherein said handle includes an upper end and a lower end and wherein said upper end of said handle is attached to said frame and wherein said handle includes a structure and configuration wherein said handle may be easily gripped;
   a pair of clips, wherein said pair of clips each include a first rib, a second rib, wherein said first rib includes a first locking member and said second rib includes a second locking member, futher wherein said first rib and second rib of said pair of clips protrude into said handle at a depth where a most inner side of said first rib and said second rib lays along the same vertical line as said writable surface of said frame;
   wherein said pair of clips are each attached to opposite sides of said handle; and
   a pair of writing instruments, wherein said pair of writing instruments each include a marker handle and a writing tip, wherein said marker handle is secured against said handle and in-between said first rib and said second rib by said first locking member and said second locking member of said pair of clips;
   wherein said pair of writing instruments each include a cap, wherein said cap includes an eraser and wherein said cap is connectable to said marker handle and covers said writing tip;
   wherein said pair of writing instruments are substantially parallel to one another and to said handle when secured within said pair of clips.

4. The hand-held writing system of claim 3, wherein said first writable surface and said second writable surface include a smooth laminate coating.

5. The hand-held writing system of claim 3, wherein said first writable surface and said second writable surface are comprised of a dry-erase write on-wipe off surface.

6. The hand-held writing system of claim 3, wherein said pair of writing instruments are comprised of a dry-erase marker.

* * * * *